United States Patent
Gupta

(10) Patent No.: US 10,936,813 B1
(45) Date of Patent: Mar. 2, 2021

(54) CONTEXT-AWARE SPELL CHECKER

(71) Applicant: Amazon Technologies, Inc., Seattle, WA (US)

(72) Inventor: Prabhakar Gupta, Delhi (IN)

(73) Assignee: Amazon Technologies, Inc., Seattle, WA (US)

( * ) Notice: Subject to any disclaimer, the term of this patent is extended or adjusted under 35 U.S.C. 154(b) by 108 days.

(21) Appl. No.: 16/427,793

(22) Filed: May 31, 2019

(51) Int. Cl.
G06F 17/27 (2006.01)
G06F 40/232 (2020.01)
G06F 40/30 (2020.01)
G06F 40/284 (2020.01)

(52) U.S. Cl.
CPC .......... *G06F 40/232* (2020.01); *G06F 40/284* (2020.01); *G06F 40/30* (2020.01)

(58) Field of Classification Search
CPC ....... G06F 40/232; G06F 40/284; G06F 40/30
USPC .......................................................... 704/9
See application file for complete search history.

(56) References Cited

U.S. PATENT DOCUMENTS

| | | | |
|---|---|---|---|
| 9,092,483 B2 * | 7/2015 | Brockett | G06F 16/24534 |
| 10,193,833 B2 * | 1/2019 | Tetreault | G06F 40/169 |
| 10,380,210 B1 * | 8/2019 | Lai | G06F 16/9535 |
| 10,489,507 B2 * | 11/2019 | Li | G06N 20/00 |
| 2001/0029455 A1 * | 10/2001 | Chin | G06F 40/58 |
| | | | 704/277 |
| 2005/0210383 A1 * | 9/2005 | Cucerzan | G06F 40/232 |
| | | | 715/257 |
| 2007/0106937 A1 * | 5/2007 | Cucerzan | G06F 16/9535 |
| | | | 715/257 |
| 2012/0246133 A1 * | 9/2012 | Hsu | G06F 40/232 |
| | | | 707/706 |
| 2017/0257329 A1 * | 9/2017 | Tetreault | G06F 40/253 |
| 2019/0057154 A1 * | 2/2019 | Philip | G06F 16/3344 |
| 2019/0087403 A1 * | 3/2019 | Hsu | G06F 40/232 |
| 2019/0102441 A1 * | 4/2019 | Malak | G06F 16/215 |
| 2019/0158439 A1 * | 5/2019 | Tetreault | H04L 51/046 |
| 2019/0205372 A1 * | 7/2019 | Li | G06N 20/00 |
| 2019/0205376 A1 * | 7/2019 | Merhav | G06F 40/284 |
| 2019/0311031 A1 * | 10/2019 | Powell | G06F 40/232 |

* cited by examiner

*Primary Examiner* — Khai N. Nguyen
(74) *Attorney, Agent, or Firm* — Lee & Hayes, P.C.

(57) ABSTRACT

A context-aware spell checker to detect non-word spelling errors and/or suggest corrections. The context-aware spell checker may utilize n-gram conditional probabilities to suggest corrections based on a context of the non-word spelling error. The suggested corrections may be presented as a prioritized list of words based on calculated scores of the n-gram conditional probabilities. Utilizing n-gram conditional probabilities may permit the context-aware spell checker to be integrated across a multitude of languages or configured according to a particular language. The context-aware spell checker may perform spell checking and suggest corrections in real-time, or may be at least partially automated, to reduce user perceived latency and delay.

20 Claims, 6 Drawing Sheets

CONTEXT-AWARE SPELL CHECKER

BACKGROUND

People write in a multitude of computer programs, such as e-mails, instant messaging, online chats, message boards, and blogs. Spell checking and correcting, either automatic or when requested by a user, is the process of detecting misspelled words or typographical errors ("typos") within these computer programs and/or providing alternate suggestions. Despite the existence of spell checking software, typos continue to exist. For example, conventional spell checkers fail to consider a context of the typo. In an effort to overcome these deficiencies and increase accuracy, some spell checkers employ extensive algorithms that determine best-matched word(s) for the typo. Such a method, however, requires increased computational capacity and increases the time to provide suggestions for the typos. As a result, users of the computer programs may experience latency or delay.

Furthermore, as languages are very different in nature, spell checkers are often built with specific rules tailored to a specific language. Such language-specific rules, however, do not permit spell checkers to be integrated or configured across multiple languages. Moreover, in some instances, certain languages may not have spell checkers that are configured to identify typos in those languages. Existing spell checkers are therefore not configurable or scalable for new languages, or between languages, given language-dependent rules.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
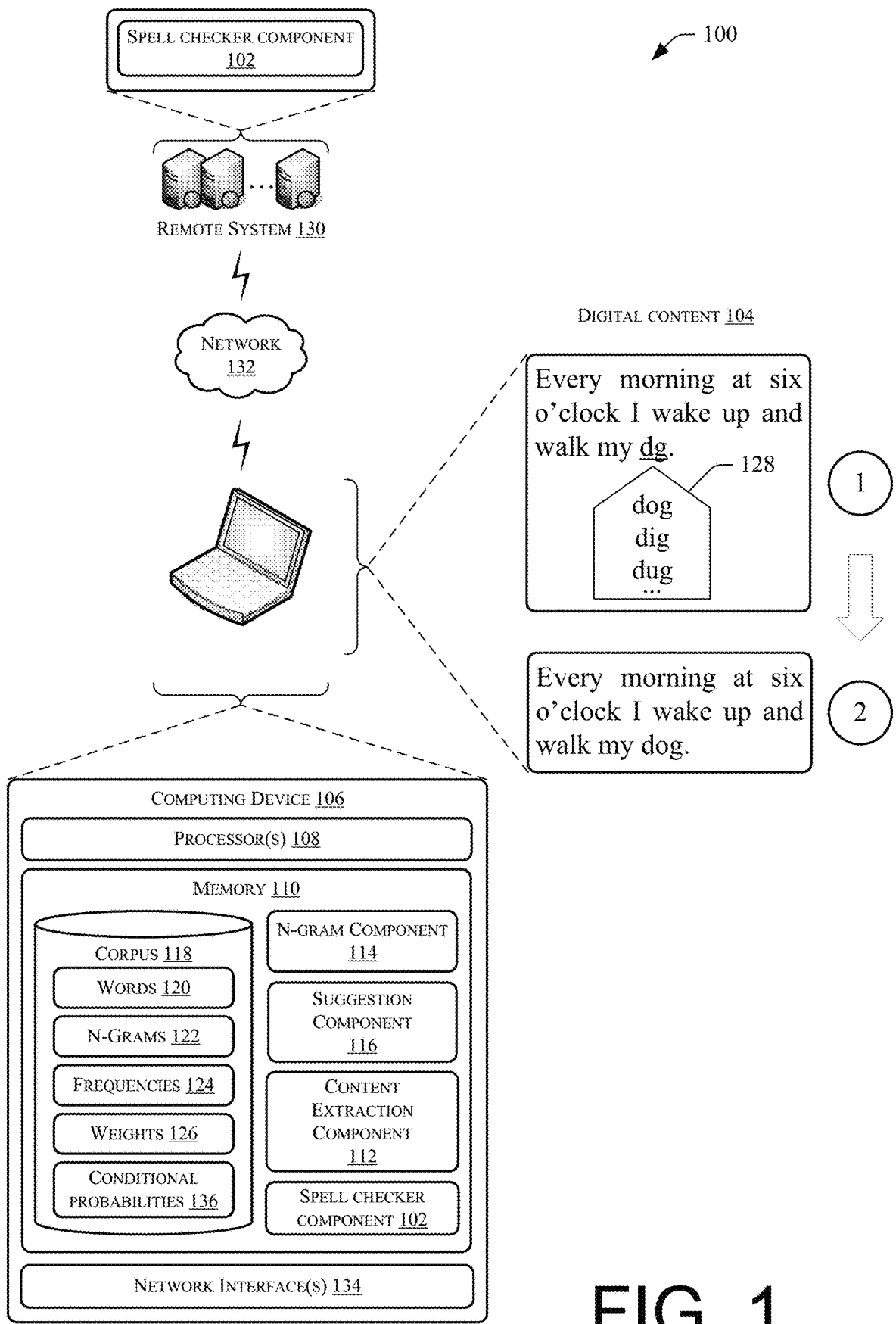
FIG. 1 is a schematic diagram of an example computing environment implementing a spell checker to determine non-word spelling errors and candidate suggestions, according to an embodiment of the present disclosure.

This disclosure is directed to systems that methods that utilize a context-aware spell checker to detect non-word spelling errors and/or suggest corrections. A non-word spelling error, or non-word error, is a typographical error corresponding to a word that does not appear in a dictionary or corpus. In some instances, the context-aware spell checker may utilize n-gram conditional probabilities to suggest corrections for the non-word spelling error based on a context of the non-word spelling error. For example, after identifying non-word spelling errors, the context-aware spell checker may determine a frequency of n-grams (or tokens) within the corpus. In this sense, the context-aware spell checker may analyze a context of the non-word spelling error for word prediction, spelling correction, and/or to suggest corrections. In some instances, the suggested corrections may be presented as a prioritized list of words based on calculated scores of the n-gram conditional probabilities. Utilizing n-gram conditional probabilities may permit the context-aware spell checker to be integrated across a multitude of languages or to be configured to a particular language. For example, employing rule-based n-gram conditional probabilities and calculating scores associated with the n-gram conditional probabilities permits the context-aware spell checker to be scalable across languages. Additionally, the context-aware spell checker may perform spell checking and suggest corrections in real-time (or near real-time), or may be at least partially automated, to reduce user perceived latency and delay.

The context-aware spell checker may access or utilize a corpus associated with a particular language or alphabet (e.g., French, English, Dutch, etc.). In some instances, the corpus may comprise a dictionary of characters, words, and/or phrases derived from online resources and/or databases (e.g., databases of movie subtitles, archives of legal documents, websites, electronic books (eBooks), etc.). In some instances, the corpus may be generated or compiled by crawling the electronic or web-based documents. For example, computing devices may browse the world wide web using automated and/or trained algorithms to gather and/or process documents to determine characters, words, and/or phrases corresponding to a particular language or alphabet. The characters, words, and/or phrases may correspond to recognized characters, words, and/or phrases, respectively, associated with the particular language (i.e., a lexicon of known words). In some instances, the characters, words, and/or phrases may be determined by the context-aware spell checker, may be received from another computing system (e.g., remote system), and/or may be input into the context-aware spell checker by a user.

In generating the corpus, the computing devices may also calculate frequency of occurrence for each unique n-gram (e.g., unigram, bigram, trigram, etc.) or token(s) for a particular language. An "n-gram" is a contiguous sequence of "n" items from a given sequence of text. In some instances, n-grams may be on a character or word level. In other words, for the characters, words, and/or phrases, the corpus may store their frequency of occurrence. For example, as part of building the corpus, the context-aware spell checker (or computing device) may break words of the digital content into their corresponding n-grams. For example, for the word "coffee," on a character level, an n-gram of size one is a unigram (e.g., the unigrams of the word "coffee" are "c," "o," "f," "f," "e," and "e"), an n-gram of size two is a bigram (e.g., the bigrams of the word "coffee" are "co," "of," "ff," "fe," and "ee"), and an n-gram of size three is a trigram (e.g., the trigrams of the word "coffee" are "cof," "off," "ffe," "fee"), and so on. On a word level, in the sentence "he drinks coffee," the unigrams are "he," "drinks," and "coffee", the bigrams are "he drinks" and "drinks coffee", and the trigram is "he drinks coffee." In this sense, a bigram, for example, represents the occurrence of a word based on the preceding word (i.e., n−1) or the succeeding word (i.e., n+1). In generating the corpus, the frequency of occurrence for the n-grams, whether on a character level and/or the word level, may be determined. For example, on a character-level, the corpus may store an indication of how many times the letter "e" follows the letter "h" (e.g., how often are they present in the same word or phrase, at what frequency they follow one another, etc.). On a word-level, the corpus may store an indication of how many times the word "coffee" follows the word "drinks," for example. As such, as part of building the corpus, characteristics of the language, such as a distribution of n-grams across the language, n-gram conditional probabilities, associations between n-grams in the language, patterns in the language, etc. may be identified.

To perform spell checking, upon receiving digital content, such as sentences of text, paragraphs of text, and so forth, the context-aware spell checker may tokenize the words of the digital content (e.g., using Python Natural Language Toolkit (NLTK)). Tokenizing the text may involve splitting or breaking the text into individual words, sentences, n-grams, and/or removing punctuation using one or more algorithms. For example, tokenizing word by identifying continuous strings of text that are separated by whitespace (i.e., spaces), punctuation marks (commas, periods, etc.), and/or line breaks. Continuous strings of text are considered "tokens" and a sentence may be made up of multiple tokens (i.e., words). Moreover, in some instances, each of the tokens, or words, may be tokenized into their respective characters. After tokenizing the text, the context-aware spell checker may compare the tokens of the text to the corpus to identify non-word spelling errors (if any). If the context-aware spell checker determines or identifies a token within the text that does not appear in the corpus, the context-aware spell checker may flag or identify this token as a potentially non-word spelling error. In this sense, the non-word spelling errors may be identified by their absence in the corpus.

After identifying the non-word spelling errors (if any), the context-aware spell checker may determine candidate suggestions for the non-word spelling errors, respectively. In some instances, the context-aware spell checker may determine candidate suggestions based at least in part on n-grams for the non-word spelling error, confused words associated with the non-word spelling error, and/or their frequency of occurrence. In some instances, the context-aware spell checker may identify candidate suggestions that have an edit distance of less than or equal to two. Generally, the edit distance represents the difference between two strings of characters and the minimum number of edits (i.e., insertions, deletions, transpositions, or substitutions) to change one word into another. An edit distance of zero means the word is spelled correctly. For example, changing the word "coffe" into "coffee" requires one edit—the insertion of "e." As such, "coffe" and "coffee" may have an edit distance of one. In some instances, limiting the candidate suggestions to an edit distance of two may reduce the amount of candidate suggestions and reduce the amount of time to determine candidate suggestions.

After identifying the candidate suggestions, the context-aware spell checker may rank or prioritize the candidate suggestions. In some instances, presenting the candidate suggestions as a prioritized list may be based on n-gram conditional probabilities for predicting a sequence of words. That is, the context-aware spell checker may utilize the frequency of occurrence for the unigrams, bigrams, and/or trigrams to determine the n-gram conditional probabilities for the candidate suggestions. For example, for the candidate suggestions, the context-aware spell checker may determine the frequency of occurrence for the trigrams "he drinks coffee" and "he drinks coffer." In other words, using the frequencies of the unigrams, bigrams, and/or trigrams stored in the corpus, the context-aware spell checker may determine a score, or likelihood, that the candidate suggestion pertains to an intended word of the non-word spelling error. Accordingly, using the n-gram conditional probabilities, the context-aware spell checker may utilize words surrounding the non-word spelling error to determine context and suggest corrections.

In some instances, the context-aware spell checker may aggregate scores for the unigram, bigram, and/or trigram to determine a composite or cumulative score for individual candidate suggestions. In some instances, the scores for the unigram, bigram, and trigram may be weighted to determine the cumulative score for the candidate suggestions, which may determine their respective rank within the list of candidate suggestions. For example, the unigram score may be assigned a weight of 0.7, the bigram score may be assigned a weight of 0.8, and the trigram score may be assigned a weight of 0.9. After applying the weights to the unigram, bigram, and trigram, the unigram, bigram, and trigram scores may be summed together to produce the cumulative score for the candidate suggestions. For each candidate suggestion, this process may be repeated and the context-aware spell checker may present the candidate suggestions with the highest scores. In some instances, the context-aware spell checker may present candidate suggestions having a cumulative score greater than or equal to a threshold amount or the context-aware spell checker may present a certain number of candidate suggestions (e.g., top five, top ten, etc.). Prioritizing the candidate suggestions may accordingly list words in order that are most natural in the context of the text.

In some instances, the weights assigned to the respective unigram, bigram, and trigrams scores may depend on the language of the corpus. That is, each language may include a weight applied to the unigram score, the bigram score, and/or the trigram score.

In some instances, utilizing unigram, bigram, and trigram scores, as compared to 4-gram and/or 5-gram scores, may reduce perceived latency. For example, calculating frequencies or n-gram conditional probabilities for 4-gram and/or 5-gram may require increased computational resources and/or increase computational time given the large possibility of combinations for the candidate suggestions. Along these lines, storing 4-grams and/or 5-grams and/or their frequencies within the corpus may demand increased memory. Albeit calculating 4-gram and/or 5-gram conditional probabilities for candidate suggestions may increase an accuracy or effectiveness of context-aware spell checker, the increase in accuracy may be minimal as compared to the amount of computational resources and/or computational time demanded to determine the n-gram conditional probabilities.

As such, given the rise of digital content, spell checking must be performed on hundreds of electronic documents in a quick amount of time (e.g., eBooks). For example, publishers may quickly publish large volumes of electronic documents at a scale and speed that traditional publishers find difficult to match. Each of the electronic documents includes text that needs to be spell checked before publishing. Time constraints necessitate systems and/or methods that accurately and effectively identify non-word spelling words in a short amount of time and suggest alternatives. The context-aware spell checker disclosed herein at least partially automates the process for identifying non-word spelling errors and provides candidate suggestions by selecting the most suitable or probable suggestions from a list of candidate suggestions based on lexical resources and n-gram conditional probabilities. Additionally, given the rule-based approached of calculating n-gram conditional probabilities, the context-aware spell checker may extend to new languages with minimal language expertise.

In some instances, the context-aware spell checker described herein may find use in a wide range of applications, including keyword-based and semantic-based searches, word processing, etc. Additionally, while discussed herein as a context-aware spell checker that identifies non-word spelling errors, in some instances, the context-aware spell checker may identify real-word spelling errors. In such instances, the context-aware spell checker may utilize n-gram conditional probabilities to suggest candidate suggestions for real-word spelling errors. For example, the spelling "color" is used in American English whereas spelling "colour" is preferred in other versions of English.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates an example architecture or environment 100 for spell checking using a spell checker component 102 that identifies non-word spelling errors within digital content 104. In some instances, the environment 100 may include a computing device 106 associated with a user, which may operate the spell checker component 102 and/or provide the digital content 104 to the spell checker component 102 for performing spell checking. While illustrated as a computer, the computing device 106 may include any type of device (e.g., a laptop computer, a tablet device, a mobile telephone, desktop computers, etc.), and may include one or more processor(s), computer-readable media, and/or a display. The digital content 104 may include any digital body of text, including eBooks, electronic magazines, blog posts, microblog entries, SMS messages, webpages, emails, other electronic documents, etc. In this sense, in some instances, the digital content 104 may represent text entered into web browsers, word processors, applications, dialogue boxes, and so forth and the computing device 106 may include an application, like word processing, that utilizes the spell checker component 102. Accordingly, as the user types, the spell checker component 102 may spell check words within the digital content 104.

As illustrated in FIG. 1, the computing device 106 may include processor(s) 108 and memory 110 storing or otherwise having access to the spell checker component 102. In some instances, the spell checker component 102 may include, or operate in conjunction with, a content extraction component 112, an n-gram component 114, a suggestion component 116, and/or a corpus 118. While the user types the digital content 104, or after the user requests spell checking on the digital content 104, for example, the processor(s) 108 may perform operations associated with the spell checker component 102 or the spell checker component 102 may otherwise operate to determine potential non-word spelling errors within the digital content 104. To determine non-word spelling errors (if any), the spell checker component 102 may utilize the corpus 118.

The corpus 118 may represent a dictionary of words associated with or corresponding to a language. In some instances, the spell checker component 102 may analyze the digital content 104 to identify a language and/or alphabet for use in selecting a corpus associated with a particular language and/or alphabet. In addition to listing the words of a particular language, the corpus 118 may list all the characters of the language. In some instances, the corpus 118 may be generated from catalogues, records, files, magazines, books, archives, other forms of media (e.g., movies having subtitles), and/or databases. Through extracting content from the databases, for instance, the corpus 118 may represent a list of recognized words or continuous sequences of characters (i.e., n-grams) for the language.

In response to receiving the digital content 104, the spell checker component 102 may cause one or more automated processes to be performed on the digital content 104. For instance, upon receiving the digital content 104, text within the digital content 104 may be converted into standardized format. For example, the spell checker component 102 may utilize the content extraction component 112 to tokenize characters of the digital content 104. For example, the spell checker component 102 may utilize a NLTK, or other algorithms, for tokenizing the digital content 104. In some instances, the content extraction component 112 may remove formatting and/or markups when tokenizing the digital content 104. The content extraction component 112 may also convert letters to a uniform case, such as lower case. As an example of tokenizing, the content extraction component 112 may tokenize the digital content 104 into the following tokens: "every," "morning," "at," "six," "o'clock," "i," "wake," "up," "and," "walk," "my," "dg". Additionally, or alternatively, the content extraction component 112 may tokenize the words on a character-level.

After tokenizing the text, the spell checker component 102 may compare the tokens with the corpus 118 to determine whether the tokens are present in the corpus 118. If all the tokens are present in the corpus 118, the spell checker component 102 may determine that no non-word spelling errors are present in the digital content 104. However, if the spell checker component 102 determines that certain tokens are not present in the corpus 118, the spell checker component 102 may identify these tokens as potential non-word spelling errors. For example, as shown in FIG. 1, the spell checker component 102 may identify "dg" as a non-word spelling error (i.e., the token "dg" does not appear in the corpus 118). In some instances, the non-word spelling error "dg" may be tokenized as a foreign character, or sequence of characters, not represented within the corpus 118. In some instances, the spell checker component 102 may indicate the non-word spelling errors by underlining, highlighting, bolding, or otherwise notifying the user of the non-word spelling error within the digital content 104.

In some instances, the spell checker component 102 may be configured to identify non-word spelling errors that include a token length of at least two. In other words, for the tokens in the digital content 104 that are at least two characters in length, the spell checker component 102 may check for their occurrence within the corpus 118. In some instances, limiting the detection of non-word spelling errors to tokens having a length of at least two characters may save computing resources and processing time.

Upon identifying any non-word spelling errors, or upon recognizing an unknown token, the spell checker component 102 may utilize the suggestion component 116 for suggesting candidate suggestions to replace the non-word spelling error. In some instances, to identify candidate suggestions, the spell checker component 102 may utilize n-grams to determine the probability of occurrence of certain characters or the overlap of characters between the candidate suggestions and the non-word spelling error. For example, the spell checker component 102 may determine, via a comparison with the corpus 118, common words that follow "walk my" (i.e., the words that succeed the non-word spelling error in the digital content 104).

In some instances, the candidate suggestions may have a maximum edit distance of two. Edit distance, or the Levenshtein distance, is a metric for measuring the difference between two strings of characters and represents, between two words, the minimum number of single-character edits (i.e., insertions, deletions, transpositions, or substitutions) required to change one word into another. Using the above example, the edit distance to change "dg" to "dog," "dig," or "dug" is one, where the single character edit is the insertion of the character "o," "i," or "u," respectively. In some instances, limiting the edit distance to two or less permits the suggestion component 116 to quickly search the corpus 118 and locate the candidate suggestions (as opposed to searching for candidate suggestions with an edit distance great than two, which would require increased computational resources and time). Stated alternatively, given the size of the corpus 118, searching the entire corpus 118 for all edit distances is time consuming and demands increased computing resources. For the purpose of this discussion, computing resources may correspond to processing power, available memory, network bandwidth, battery power, and so on. Accordingly, in some instances, for an unrecognized token, the unrecognized token may be compared against the words of the corpus 118 with an edit distance equal to or less than two, thereby decreasing the time to determine the candidate suggestions.

Additionally, for longer non-word spelling errors, there may exist numerous candidate suggestions with an edit distance of two. Such process is also time consuming and demands an increase in computational resources. To reduce the amount of time and computing resources utilized, in some instances, the spell checker component 102 may utilize a symmetric delete algorithm (SDA). In some instances, the SDA may reduce the complexity of candidate suggestion by only using deletions instead of deletions, transpositions, replacements, and insertions. Using SDA may result in a significance performance gain, is orders of magnitude faster than other string-search algorithms, and is language independent (i.e., the alphabet is not required for deleting characters).

In some instances, the suggestion component 116 may take into consideration a context of the non-word spelling error when suggesting candidate suggestions (i.e., the words surrounding the non-word spell error). In some instances, the candidate suggestions may be ranked based at least in part on determining n-gram conditional probabilities respectively their frequency within the corpus 118. For example, as shown in FIG. 1, the corpus 118 may include words 120, n-grams 122, frequencies 124, weights 126, and/or conditional probabilities 136. The words 120 may represent the words of the language to which the corpus 118 corresponds, the n-grams 122 may represent phrase, sentences, of the words of the language to which the corpus 118 corresponds, the frequencies 124 may represent frequencies of the words (or n-grams) within the corpus 118, the weights 126 may represent a weight applied to n-grams conditional probabilities, and the conditional probabilities 136 may represent the probability of a particular word preceding or succeeding a string of words. For example, the n-gram component 114 may calculate the frequency of unigram, bigram, and/or trigrams of words within corpus 118. Using the frequencies of the unigram, bigrams, and/or trigrams, the n-gram component 114 may calculate n-gram conditional probabilities for the candidate suggestions. That is, the n-gram component 114 may determine how likely that candidate suggestions follow (or precede) a given string of words in the digital content 104. For example, for unigrams, the n-gram conditional probability within the corpus 118 may be represented by the following equation.

$$P(w_i \mid w_{i-n+1} \ldots w_{i-1}) = \frac{c(w_{i-n+1} \ldots w_i)}{c(w_{i-n+1} \ldots w_{i-1})}$$

where:
P is the n-gram conditional probability;
c is the count or frequency of the n-gram in the corpus;
n is the amount of words in the string of characters;
w is the words in the content; and
i is the index.

For each candidate suggestion, a score may be calculated, where the score represents the likelihood of the candidate suggestion corresponding to the likelihood of the candidate suggestion being the intended word. In some instances, the score for the candidate suggestions may be a weighted sum of the unigram score, the bigram score, and/or the trigram score. For example, the unigram score, the bigram score, and/or the trigram score may be calculated using the following equation.

$$S_n = W_n \sum_{j=0}^{n-1} \frac{c(x_{i+j-n+1}^{i+j})}{c(x_{i+j-n+1}^{i+j-1})}$$

$$= W_n \sum_{j=0}^{n-1} P(x_i \mid x_{i+j-n+1}^{i+j})$$

where:
$S_n$ is the score for the n-gram (e.g., $S_1$ is the unigram score; $S_2$ is the bigram score, and $S_3$ is the trigram score);
i is the index of the misspelled token;
$W_n$ is the weight for the $n^{th}$-gram's score;
$c(x_i^j)$ is the occurrence frequency of the sequence ($W_i \ldots W_j$); and
P is the n-gram conditional probability.

In some instances, the n-gram component 114 may determine frequencies of the n-gram patterns that occur in the corpus 118, such as a frequency that individual n-grams are used, a frequency that individual n-grams are associated with other n-grams (e.g., how often are they present in the same word, at what frequency do they follow one another, etc.). The frequency of occurrence of each n-gram in the corpus 118 may be determined for comparison with the frequency of other candidate suggestions. Utilizing the weights 126, the spell checker component 102 may apply a respective weight to the unigram, bigram, and/or trigram conditional probability (or score). Noted above, scores for the unigrams, bigrams, and/or trigrams may be considered when generating the cumulative score for the candidate suggestion. In some instances, the weights applied to the unigram, bigram, and/or trigram conditional probabilities may be based at least in part on the language of the corpus 118.

To illustrate, and utilizing the example shown in FIG. 1, candidate suggestions for the token "dg" may include "dog," "dig," and "dug." The n-gram component 114 may determine the frequency of "dog," "dig," and "dug" (i.e., unigrams) within the corpus 118. For bigrams, the n-gram component 114 may determine a frequency of "my dog," "my dig," and "my dug" within the corpus 118. Additionally, the n-gram component 114 may determine the frequency of "walk my dog," "walk my dig," and "walk my dug," within the corpus 118. That is, the n-gram component 114 may utilize the candidate suggestions to determine a frequency of the candidate suggestions within the corpus 118 (i.e., utilizing the frequencies 124) and/or conditional probabilities (i.e., utilizing the conditional probabilities 136). After determining the frequency, or conditional probabilities, the spell checker component 102 may assign weights. For example, for the unigram conditional probability, the spell checker component 102 may assign a weight of 0.5, for the bigram conditional probability the spell checker component 102 may assign a weight of 0.6, and for the trigram conditional probability the spell checker component 102 may assign a weight of 0.8. Noted above, the weights 126 may be particular to the language of the corpus 118 to account for characteristics of the language.

While the accuracy or effectiveness of the spell checker component 102 may increase using 4-gram and/or 5-gram conditional probabilities, the amount of time and computing resources required to determine the conditional probabilities for these n-grams may be too large. For example, for the English language, the number of tokens in 5-grams is more than 323 million and the total memory size required to store these tokens exponentially increases with the size of "n." In some instances, the accuracy or effectiveness of the spell checker component 102 using 4-gram and/or 5-grams may be insignificant or minimal when considering the decreased computational load when determining unigram, bigram, and/or trigram conditional probabilities (i.e., when n≤3).

Upon identifying the candidate suggestions, determining the cumulative score for each of the candidate suggestions (i.e., the unigram, bigram, and/or trigram n-conditional probabilities), the candidate suggestions may be presented as a prioritized list. The candidate suggestions may be selectable options for insertion into the digital content 104. For instance, as shown in FIG. 1, the candidate suggestions for "dg" may be presented within a pop-up box or menu 128 on the computing device 106 (or a display or user interface thereof). The menu 128 illustrates the candidate suggestions being "dog," "dig", and "dug." However, other candidate suggestions may be presented and/or the user may be permitted to scroll through the candidate suggestions within the menu 128. In the illustrative example, as the corpus 118 likely contains a higher frequency of n-grams corresponding to "walk my dog," than "walk my dig" or "walk my dug," for example, the n-gram conditional probability for the candidate suggestion of "dog" may be higher than "dig" or "dug." In this sense, using the corpus 118 and the conditional probabilities 136, the n-gram component 114 may determine a probability that the word "dog" follows the bigram "walk my." Similar n-gram conditional probabilities for unigrams and trigrams may be calculated.

Upon locating the correct candidate suggestions, the user may select the word and in response, the sword may be inserted into the digital content 104, as shown from "1" to "2" to replace the non-word spelling error.

In some instances, the computing device 106 may operate in conjunction with a remote system 130. The remote system 130 may include or otherwise have access to the spell checker component 102, and/or other components of the spell checker component 102 (e.g., the n-gram component 114, the corpus 118, etc.). In examples, the components of the remote system 130 may include their own processor(s), network interface(s), and/or memory. Additionally, the operations and/or functionalities associated with and/or described with respect to the components of the remote system 130 may be performed utilizing cloud-based computing resources. In some instances, the components of the remote system 130 may perform some of or all of the operations performable by the computing device 106 and/or the spell checker component 102. That is, some or all of the components and/or functionalities associated with the spell checker component 102 may be performed by the remote system 130. For example, as the remote system 130 may have a computational capacity that far exceeds that of the computing device 106, in some instances, the remote system 130 operate the spell checker component 102 to generate the corpus 118, for example. In such instances, the computing device 106 may include an initialization phase where the corpus 118 is loaded into the memory 110 to decrease the execution time of lookups made in the corpus 118. Accordingly, processing may be performed on the computing device 106 and the remote system 130 when carrying out functions of the spell checker component 102. In some instances, the remote system 130 may be local to an environment associated the computing device 106. For instance, the remote system 130 may be located within the computing device 106.

In some instances, the computing device 106 and the remote system 130 may communicatively couple over a network 132. For example, the computing device 106 may include one or more interfaces, such as network interface(s) 134, to facilitate the wireless connection to the network 132. The network 132 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

In some instances, performing spell checking on the digital content 104 by the spell checker component 102 and/or the remote system 130 may automated. For example, upon detecting that the user is typing, or upon receiving the digital content 104, the content extraction component 112 may tokenize the digital content 104 and the spell checker component 102 may analyze the tokenized words to detect non-word spelling errors. Once the non-word spelling errors are detected, the suggestion component 116 may generate ranked suggestions for the non-word spelling error utilizing, for instance, the n-gram component 114 and/or the corpus 118. The spell checker component 102 may be capable of determining whether the digital content 104 contains non-word spelling errors and suggest corrections in real-time or near real-time to enable the spell checker component 102 to reduce user perceived latency. Additionally, the spell checker component 102 may perform spell checking on multiple electronic documents in parallel and/or in series to handle large volumes. Accordingly, the spell checker component 102 may be used to determine, in near real-time, with little or no latency, whether electronic documents include non-word spelling errors and may present, in near real-time, potential suggestions for the non-word spelling errors.

As used herein, a processor, such as processor(s) 108 and/or the processor(s) described with respect to the components of the remote system 130, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or the processor(s) described with respect to the components of the remote system 130 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or the processor(s) described with respect to the components of the remote system 130 may possess its own local memory, which also may store program components, program data, and/or one or more operating systems.

The memory 110 and/or the memory described with respect to the components of the remote system 130 may include volatile and nonvolatile memory, removable and non-removable media implemented in any method or technology for storage of information, such as computer-readable instructions, data structures, program component, or other data. Such memory 110 and/or the memory described with respect to the components of the remote system 130 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 110 and/or the memory described with respect to the components of the remote system 130 may be implemented as computer-readable storage media ("CRSM"), which may be any available physical media accessible by the processor(s) 108 and/or the processor(s) described with respect to the remote system 130 to execute instructions stored on the memory 110 and/or the memory described with respect to the components of the remote system 130. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

As used herein, the term "component" is intended to represent example divisions of executable instructions for purposes of discussion, and is not intended to represent any type of requirement or required method, manner or organization. Accordingly, while various "components" are described, their functionality and/or similar functionality could be arranged differently (e.g., combined into a fewer number of components, broken into a larger number of components, etc.). Further, while certain functions and components are described herein as being implemented by software and/or firmware executable on a processor, in other instances, any or all of the modules can be implemented in whole or in part by hardware (e.g., a specialized processing unit, etc.) to execute the described functions. The components described herein may also be executed across multiple devices. Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated environment 100.

Additionally, although the computing device 106 and/or the remote system 130 is illustrated as having certain components, the architectures, systems, and individual elements described herein may include many other logical, programmatic, and physical components, of which those shown in the accompanying figures are merely examples that are related to the discussion herein.

Figure 2:
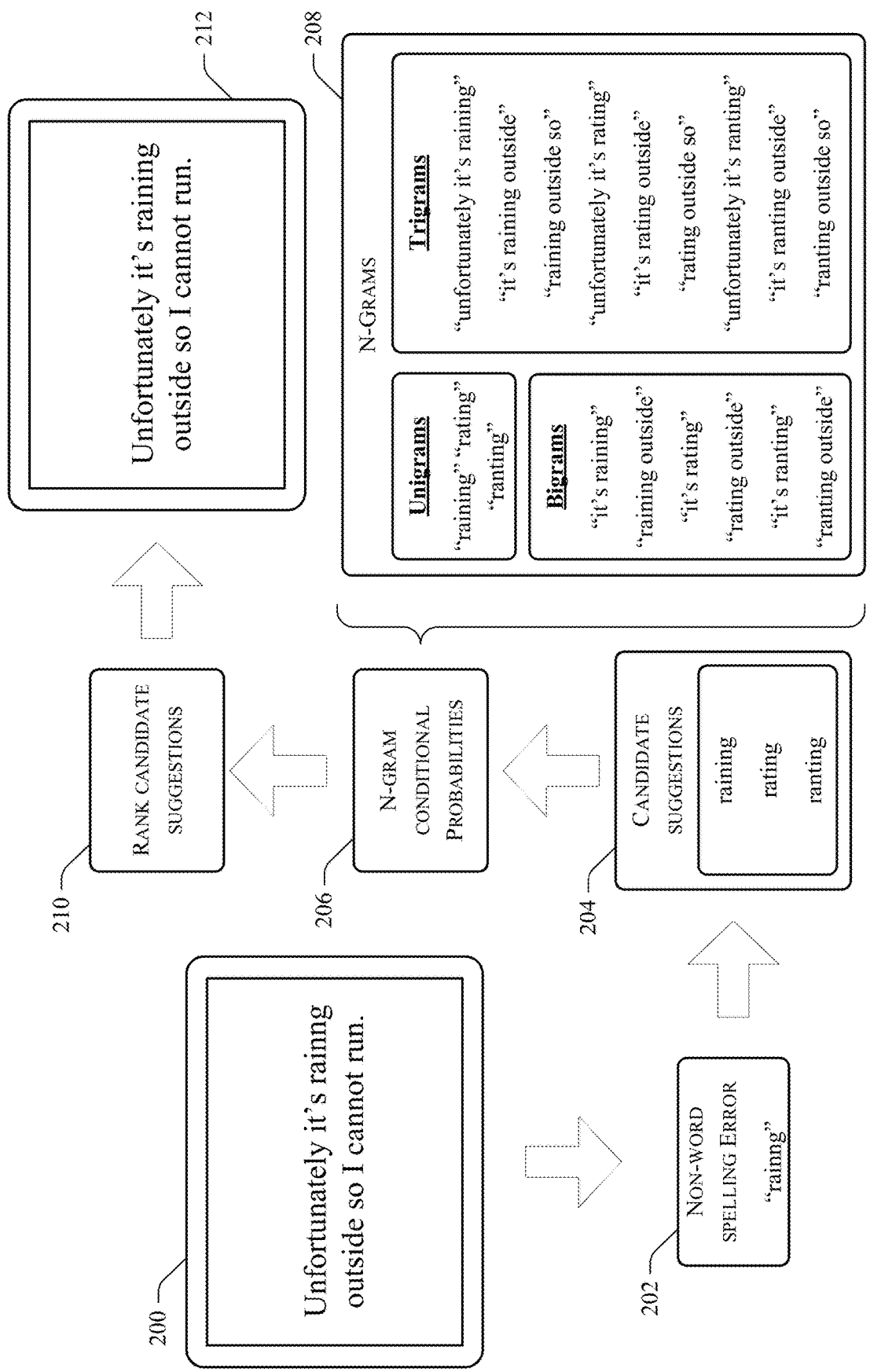
FIG. 2 is an example diagram implementing a spell checker to determine non-word spelling errors and candidate suggestions, according to an embodiment of the present disclosure.

FIG. 2 illustrates an example process for determining candidate suggestions by calculating n-gram conditional probabilities. For example, at 200 a user may type on a computing device "Unfortunately it's rainng outside so I cannot run." As shown in FIG. 2, this sentence may be presented on a display of the computing device. The spell checker component 102 may tokenize the typed words (or characters) into "unfortunately," "it's," "rainng," "outside," "so," "I," "cannot," "run." After tokenizing the words, the spell checker component 102 may determine non-word spelling errors at 202. For example, the spell checker component 102 may compare the tokens to the corpus 118 to determine whether the tokens are located in the corpus 118. In the example illustrated, the corpus 118 does not include the token "rainng," and as such, the spell checker component 102 may identify "rainng" as a non-word spelling error.

Next, at 204, the spell checker component 102 may determine candidate suggestions for the non-word spelling error. In some instances, the candidate suggestions for the non-word spelling error may be determined using a maximum edit distance of two. For example, as shown, the words "raining," "rating," and "ranting" may be candidate suggestions. More particularly, "raining" has an edit distance of one (e.g., add "i"), "rating" has an edit distance of two (e.g., delete "n" and add "t"), and "ranting" has an edit distance of two (e.g., transpose "n" and add "t"). In some instances, the spell checker component 102 may determine the candidate suggestions using n-grams within the corpus 118. For example, after identifying the non-word spelling error, the spell checker component 102 may determine words that commonly succeed "unfortunately it's" or what words commonly precede "outside." Through a comparison of these n-grams with the corpus 118, the spell checker component 102 may determine the words "raining," "rating," and/or "ranting," for example, as candidate suggestions.

After determining the candidate suggestions, the spell checker component 102 may determine n-gram conditional probabilities 206 for the candidate suggestions. As shown in FIG. 2, the spell checker component 102 may determine the unigrams, bigrams, and trigrams 208 for the candidate suggestions. For the unigram, the spell checker component 102 may determine the frequency of the words "raining," "rating," and "ranting" within the corpus 118. For the bigrams and trigrams, the spell checker component 102 may utilize the words surrounding the non-word spelling error to determine a context of the non-word spelling error. For example, the spell checker component 102 may determine a frequency of the bigrams "it's raining," "its rating," and "its ranting" within the corpus 118. Similarly, the spell checker component 102 may determine a frequency of the trigrams "unfortunately it's raining," "unfortunately it's rating," and "unfortunately it's ranting" within the corpus 118. As such, for the individual unigrams, bigrams, and trigrams of the candidate suggestions, the spell checker component 102 may determine, based on the frequency of occurrence, the n-gram conditional probabilities for the candidate suggestions. For example, the spell checker component 102 may determine that "unfortunately it's raining" occurs more frequently that "unfortunately it's ranting." The n-gram conditional probabilities provide a statistical indication of how well the spell checker component 102 scores phrases of words (e.g., n-grams). By examining the sequences of words, a score may be generated that indicates the correctness or probability of the candidate suggestion being an intended word of the user.

Additionally, or alternatively, the spell checker may determine the frequency of occurrence of characters within the corpus 118. For example, the model may determine a frequency that the trigram "ing" is present, and may determine a frequency that the trigram "ing" is associated with "rain." That is, the spell checker component 102 may determine how often "ing" and "rain" are present in the same word and/or at what frequency they succeed one another in the same word.

Utilizing the n-gram conditional probabilities, the spell checker component 102 may rank the candidate suggestions at 210 based on a cumulative score of the unigrams, bigrams, and/or trigrams. In some instances, the n-gram conditional probabilities for the unigrams, bigrams, and/or trigrams may be weighted when determining the cumulative score. For example, the unigrams may include a weight of 0.8, the bigrams may include a weight of 0.9, and the trigrams may include a weight of 1.0. In some instances, the weight assigned to the unigrams, bigrams, and/or trigrams may be based at least in part on the language of the corpus 118. As such, for each language, the unigrams, bigrams, and/or trigrams may be assigned a different weight when ranking the candidate suggestions.

In the example shown in FIG. 2, the candidate suggestion "raining" may be presented as the highest ranked candidate suggestion. As such, the user may be permitted to select the candidate suggestion, or the candidate suggestion may be automatically inserted into the sentence, as shown at 212.

Figure 3:
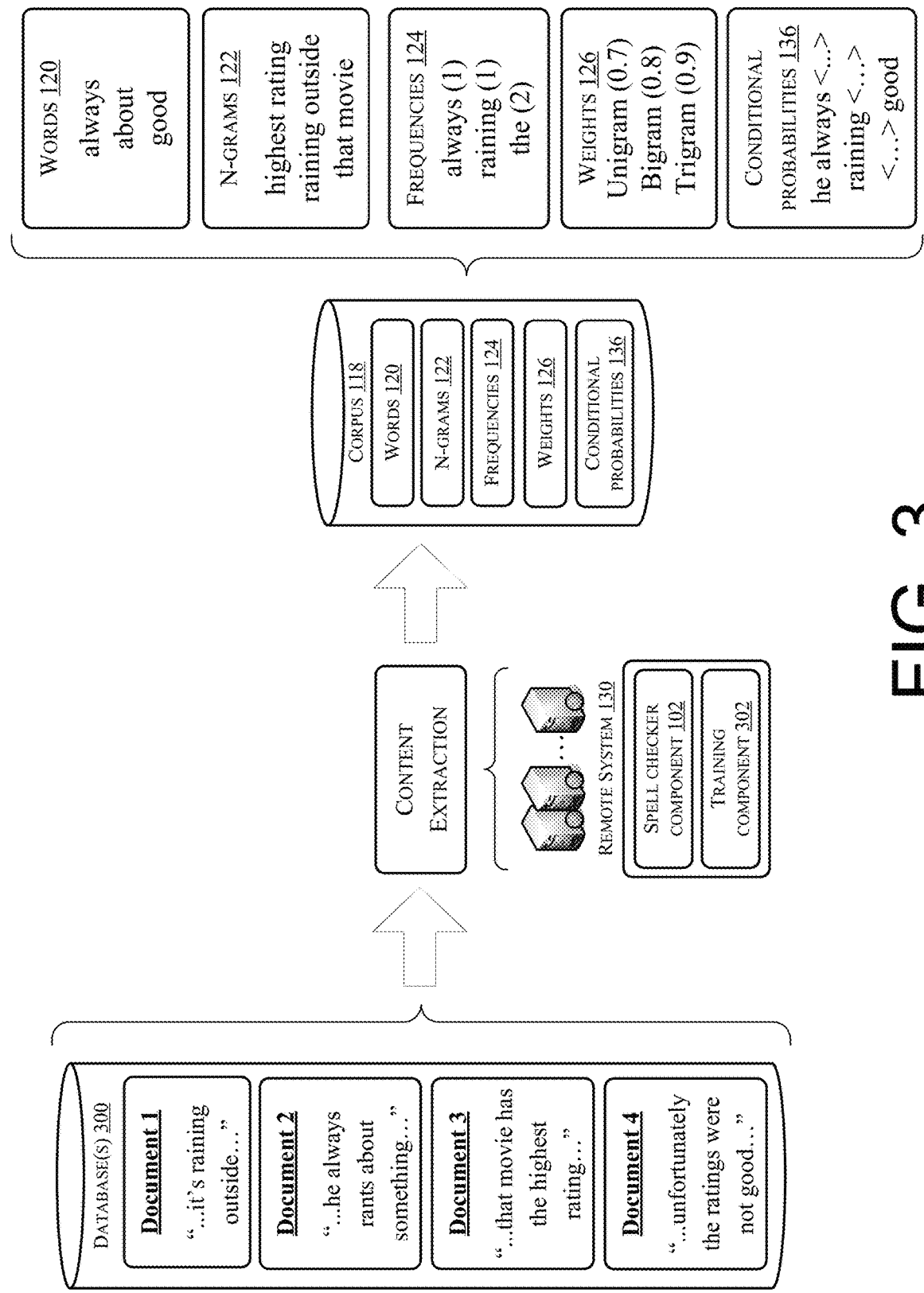
FIG. 3 is an example diagram for generating a corpus usable by a spell checker, according to an embodiment of the present disclosure.

FIG. 3 illustrates an example process for building or training a corpus for a particular language. The corpus, may represent, for a particular language, a lexicon of known words. For ease of discussion, FIG. 3 may illustrate the process for building the corpus 118. Initially, content may be extracted from one or more online resources or database(s) 300. The database(s) 300 may store or otherwise have access to electronic documents of a known language and/or alphabet, including dictionaries, text from webpage(s), text from subtitles in movies, etc. For example, shown in FIG. 3, the database(s) 300 may store four electronic documents. However, it is to be understood that the database(s) 300 may store or have access to hundreds, thousands, hundreds of thousands, and/or millions of electronic documents. For example, in some instances, the bigger the corpus, the more accurate or effective the spell checker component 102 may be for detecting non-word spelling errors and/or ranking candidate suggestions.

The database(s) 300 may be used for preparing, processing, and/or managing linguistic information needed when performing spell checking. For example, as part of building the corpus 118, the remote system 130 may include a training component 302 that breaks words of the electronic documents into their corresponding n-grams, such as extracting or normalizing content within the electronic documents. Through extracting and/or normalizing the electronic documents, the training component 302 may determine characters, words, and n-grams associated with a particular language. For example, for the word "raining," the training component 302 may break the word into unigrams (i.e., "r," "a," "i," "n," "i," "n," "g"), bigrams (i.e., "ra," "ai," "in," "ni," "in," and "ng") and trigrams (i.e., "rai," "ain," "ini," "nin," and "ing"). In some instances, the training component 302 may learn characteristics of the language to which the electronic documents correspond and may train the corpus 118 using the extracted characters, words, and/or n-grams. In some instances, the training component 302 may be configured to consider n-grams that appear in at least a threshold number of different words. For example, the training component 302 may only consider unigrams that are longer than one character and were found more than five times in the electronic documents when generating the corpus 118.

After extracting the words and phrase, the training component 302 may analyze words of the corpus 118 to identify certain characteristics. The extracted data may be used to reduce the number of unknown words within the corpus 118. Additionally, the extracted data may identify combinations of syllables for use in determining information about the relationships among syllables and their frequencies within the language. For example, through extracting the content, the training component 302 may build the corpus 118 that includes the words 120, the n-grams 122, the frequencies 124, and/or the conditional probabilities 136. In some instances, the training component 302 may identify characteristics of the language, such as a distribution of n-grams across the language, associations between n-grams in the language, patterns occurring in the language, etc. For example, the training component 302 may determine a frequency that the word "outside" follows the word "raining." In this sense, the training component 302 may determine the conditional probabilities 136 of the word "outside" succeeding the word "raining."

The training component 302 may also utilize the database(s) 300 to determine or generate the weights 126. For example, in some instances, if unigram and/or trigram scores are given a higher weight, the performance of the spell checker component 102 may decrease. Additionally, or alternatively, in some instances, applying a decreased weight to lower-ordered n-grams and applying an increased weight to higher-ordered n-grams may also decreases performance. Therefore, finding the right balance between each weight may be important for the accuracy and performance of the spell checker component 102. The corpus 118 may store the weights 126 for use when generating and/or ranking candidate suggestions.

Through building the corpus 118, the spell checker component 102 may later utilize the corpus 118 to recognize characters, words, and/or n-grams. Such characters, words, and/or n-grams may be utilized to determine the n-gram conditional probabilities when determining and/or ranking candidate suggestions. For example, the training component 302 may analyze database(s) 300 to determine the frequency of unigrams, bigrams, and trigrams. That is, upon analyzing the database(s) 300, the training component 302 may extract the frequency of occurrence for the unigrams, bigrams, and trigrams and store the number of occurrences within the corpus 118 for use by the spell checker component 102. The number of occurrences within the corpus 118 may be used for prioritizing candidate suggestions in the natural context of the sentence were the non-word spelling error is located. For example, conditional probabilities 136 may be used to indicate the likelihood of a word preceding or succeeding certain n-grams (i.e., to predict the preceding or next word in a string). As shown in FIG. 3, for example, the training component 302 and/or the corpus 118 may determine, or store, an indication of the conditional probability of certain words following the string "he always." That is, using the corpus 118, the n-gram component 114 may determine the conditional probability for the candidate suggestions following the string "he always." As such, the corpus 118 may represent a computational model that uses characteristics of a corresponding language (e.g., a distribution of n-grams, associations between n-grams, patterns, etc.) to probabilistically determine and/or rank candidate suggestions based on the n-gram conditional probabilities. Using the corpus 118, the spell checker component 102 may derive a probability distribution of the candidate suggestion using the preceding word(s) and/or the succeeding word(s).

Although FIG. 3 illustrates building a corpus for a particular language, corpuses may be built for a plurality of languages using the process described above. For example, for each language, the training component 302 may analyze different databases corresponding to a particular language to perform similar analysis as described herein. Accordingly, based on the analysis and evaluation of each language, the training component 302 may build a respective corpus that is associated with the language.

Additionally, although the corpus 118 illustrates a particular format, additional formats may be used. In some instances, to reduce a size of the corpus 118, characters, words, and/or n-grams within the corpus 118 may be compressed using hashing. In such instances, the corpus 118 may represent a hash code repository. The corpus 118 may contain a hash map, index, linked list, table, distributed database solution, and the like for the characters, words, and/or n-grams within the corpus 118 to allow faster lookup times and/or reduce the amount of memory needed to store the corpus 118. For example, a hash map for all the words in the corpus 118 may be generated and each word within the corpus 118 may be assigned a unique integer identification number. Using each word's identification number, a tree-like structure may be generated, where each node represents each word (or identification number) and its children are represented as n-grams beginning with that node's value. Hashing the words within the corpus 118 may allow the spell checker component 102 to quickly compute hash code for text and compare the hash code to the hash codes within the corpus 118. As such, after the text has been tokenized, the spell checker component 102 may select n-grams starting with the first word and calculating a first hash code based on the first n-gram. The spell checker component 102 may select a second n-gram starting with the second word, and calculate a second hash code based on the second n-gram. In some instances, this process may repeat until each word of the is included in at least one n-gram or until a specified number of n-grams have been selected. Accordingly, the spell checker component 102 may compute hash codes of sets of words (e.g., n-grams) of the digital content and compare the computed hash codes with retained hash codes. That is, upon receiving digital content, the content may be extracted, hashed into hash codes, and the compared with the stored hash codes to identify potentially matching hash codes.

Figure 4:
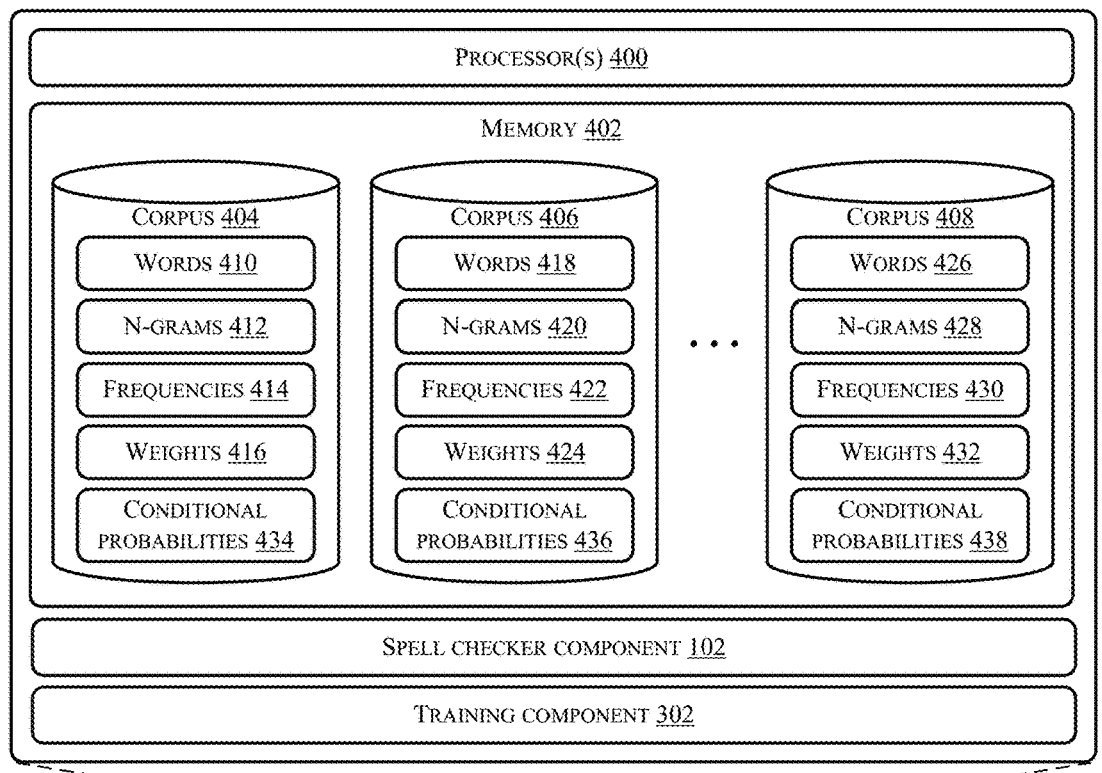
FIG. 4 is a schematic diagram of a remote system within the example computing environment of FIG. 1, according to an embodiment of the present disclosure.

FIG. 4 illustrates example components of the remote system 130. As noted above, the remote system 130 may include the spell checker component 102 and the training component 302. Processor(s) 400 may execute or perform operations of the remote system 130 that are stored in memory 402. As discussed above, the training component 302 may extract content from online database(s), or other sources of information, to generate corpuses for one or more languages. For example, as shown in FIG. 4, the memory 402 may store or otherwise have access to one or more corpuses, such as a first corpus 404, a second corpus 406, and/or a third corpus 408. In some instances, each of the corpuses (e.g., the first corpus 404, the second corpus 406, and/or the third corpus 408) may correspond to a difference language or alphabet. For example, the first corpus 404 may correspond to English, the second corpus 406 may correspond to German, and the third corpus 408 may correspond to Dutch. However, the memory 402 may store or otherwise have access to a plurality of other corpuses associated with a particular language, such as, but not limited to, Bengali, Czech, Danish, Finnish, French, Greek, Hindi, Indonesian, Marathi, Polish, Portuguese, Russian, Spanish, Swedish, Tamil, Vietnamese, Punjabi, Malay, and Thai. The spell checker component 102 may therefore easily extend to new languages using trained corpuses.

As shown in FIG. 4, the first corpus 404 may include words 410, n-grams 412, frequencies 414, weights 416, and conditional probabilities 434, the second corpus 406 may include words 418, n-grams 420, frequencies 422, weights 424, and conditional probabilities 436, and the third corpus 408 may include words 426, n-grams 428, frequencies 430, weights 432, and conditional probabilities 438. The words 410, 418, and 426 may represent words of the corpuses, respectively, or words recognized by the language to which the respective corpus corresponds. The n-grams 412, 420, and 428 may represent n-grams (e.g., bigrams, trigrams, 4-grams) of the language. For example, the n-grams 412, 420, and 428 may include character n-grams of the corpus (e.g., "ing" for a trigram) or word n-grams (e.g., "I went driving" for a trigram). The frequencies 414, 422, and 430 may represent a frequency of the n-grams (or token(s)) within the respective corpuses, whether on a character level and/or word level. For example, the frequencies 414 for the first corpus 404 may include a frequency of the trigram "ing" and/or a frequency of the trigram "I went driving." Discussed above, the frequencies of the n-grams for the respective corpuses are utilized to determine n-gram conditional probabilities when ranking candidate suggestions.

The corpuses may also include weights 416, 424, and 432, respectively. The weights 416, 424, and 432 may represent weights of the unigram, bigram, and trigram scores when calculating n-gram conditional probabilities. In some instances, each corpus may include different weights to apply to the unigram, bigram, and trigram scores, respectively. For example, for the first corpus 404, the unigram weight may be 0.5, the bigram weight may be 0.6, and the trigram weight may be 0.9. For the second corpus 406, the unigram weight may be 0.7, the bigram weight may be 0.6, and the trigram weight may be 0.85. For the third corpus 408, the unigram weight may be 0.4, the bigram weight may be 0.8, and the trigram weight may be 0.9. As languages are different in nature, the weights assigned to the unigram, bigram, and trigram scores may be tailored to the particular language and depending on the natural linguistics of the language, how people communicate in the language, and/or local variants or dialects of the language. In some instances, the weights 416, 424, and 432 may be determined via the training component 302 based on the particulars of the language to which the corpus corresponds.

The corpuses may also include the conditional probabilities 434, 436, and 438, respectively. The conditional probabilities 434, 436, and 438 may represent the probabilities that a particular candidate suggestion, or word, follows the preceding word(s) or succeeding word(s) in the corpuses 404, 406, and 408, respectively. For example, using the corpus 404, the conditional probabilities 434 may represent a probability that a particular word or candidate suggestions follows a string of words. Such conditional probabilities 434 may be used to determine and/or rank candidate suggestions relative to one another.

In some instances, the corpuses may be updated. For example, either continuously or at predetermined intervals, the corpuses may be updated to include new words and/or n-grams, which may be used to update the frequencies and/or the weights. In some instances, the spell checker component 102 may also receive feedback based on the candidate suggestions selected, which may be used to update the frequencies and/or the weights to better determine n-gram conditional probabilities and rank the candidate suggestions.

In some instances, the remote system 130 may transmit a particular corpus to the computing device 106. For example, if a user operating the computing device 106 is typing in French, the remote system 130 may transmit, or at least provide access to, a corpus corresponding to French to the computing device 106. Therein, the computing device 106 may utilize the French corpus when performing spell checking on digital content.

Figure 5:
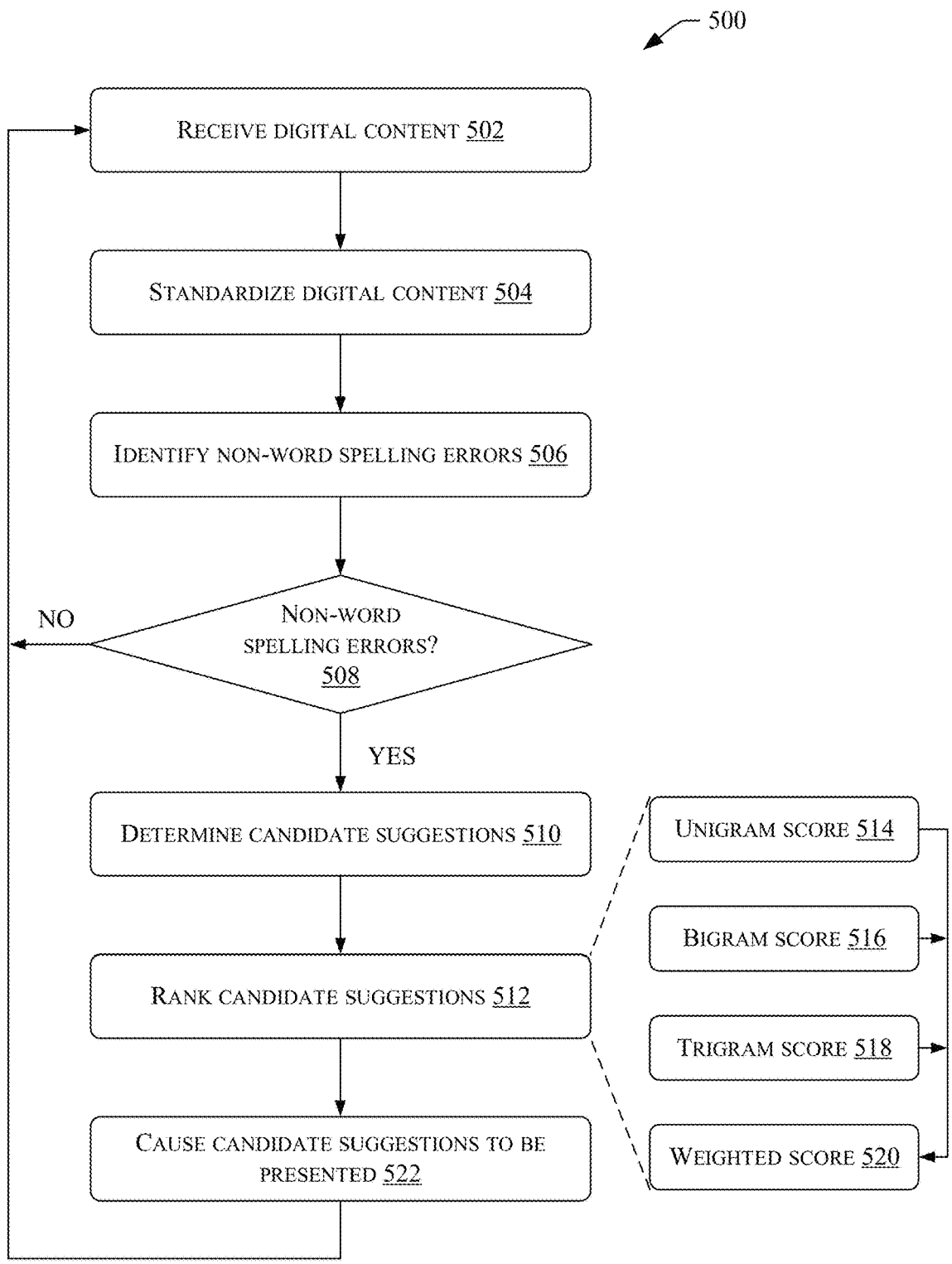
FIG. 5 is a flow diagram of an illustrative process for determining non-word spelling errors and candidate suggestions, according to an embodiment of the present disclosure.
Figure 6:
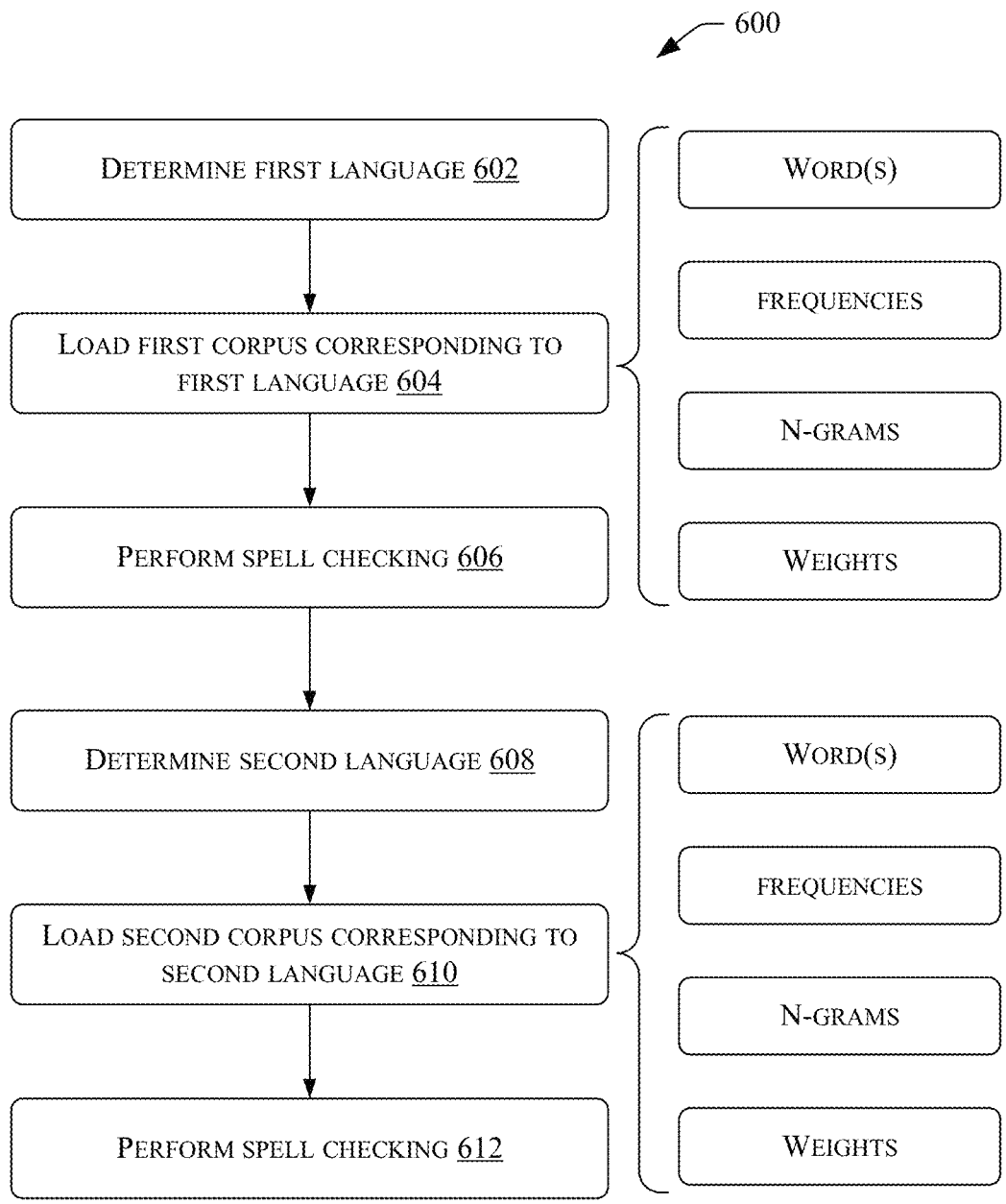
FIG. 6 is a flow diagram of an illustrative process for configuring a spell checker for a particular language, according to an embodiment of the present disclosure.

FIGS. 5 and 6 illustrates processes according to the embodiments of the instant application. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4, although the processes may be implemented in a wide variety of other environments, architectures and systems.

FIG. 5 illustrates an example process 500 for performing spell checking and suggesting candidate suggestions for non-word spelling errors. In some instances, the process 500 may be performed by the computing device 106. However, the process 500 may additionally or alternatively be performed at least in part by the remote system 130 and/or one or more additional computing resources. Furthermore, while the process 500 is described with reference to a digital item or content that includes text, it should be understood that other types of digital items or content, such as video items or audio items may be processed in a similar manner.

At 502, the process 500 may receive digital content or data associated with the digital content (e.g., text data). In some instances, the process 500 may receive the digital content upon a submission by a user (e.g., user requesting spell check) or may be received automatically and in real time as the user types.

At 504, the process 500 may convert the digital content into a standardized format. For example, the content extraction component 112 may tokenize text of the digital content. In some instances, the content extraction component 112 may also convert the digital content to a uniform case (e.g., upper case or lower case), remove formatting (e.g., bold, italics, and the like), remove markups, and the like. In some instances, when the digital content is received, the n-gram component 114 may select n-grams (e.g., sets of words) starting with a first word of the digital content. In some instances, the n-gram component 114 may select overlapping n-grams that include n consecutive words until each word of the digital content is included in at least one n-gram.

At 506, the process 500 may identify non-word spelling errors in the digital content. For example, after tokenizing the digital content, the spell checker component 102 may compare the tokenized words with the corpus 118. If the spell checker component 102 identifies a token that does not appear in the corpus 118, the spell checker component 102 may identify the token(s), if any, as potential non-word spelling errors. As noted above, the corpus 118 may contain a list of identified or recognized words for a particular language. In some instances, the process 500 may limit detection of non-word spelling errors to tokens that have at least two, or greater than, two characters.

In some instances, the spell checker component 102 may access a corpus associated with the particular language. In some embodiments, and as stated above, the corpus 118 may be generated from electronic documents written in a particular language. In some instances, the spell checker component 102 may identify a language and/or alphabet corresponding to the digital content. For example, the spell checker component 102 may analyze the token(s) to determine a corresponding language of the digital content. In some instances, the spell checker component 102 may access, load, or select a particular corpus based at least in part on the language.

At 508, the process 500 may determine whether the digital content contains non-word spelling errors. For example, if the spell checker component 102 determines that all the tokens are present in the corpus 118, the spell checker component 102 may determine that no non-word spelling errors are present in the digital content. In such instances, from 508, the process 500 may loop to 502 to receive additional digital content for spell checking. If, however, the spell checker component 102 determines that certain tokens are not present in the corpus 118, the spell checker component 102 may determine that the digital content contains non-word spelling errors.

At 510, the process 500 may determine candidate suggestions for the non-word spelling errors. In some instances, determining the candidate suggestions may involve analyzing the tokens relative to the corpus 118. For example, the suggestion component 116 may determine candidate suggestions for the non-word spelling errors based at least in part on looking for the n-grams similar to those for the non-word spelling error. In some instances, the suggestion component 116 may determine candidate suggestions that have an edit distance of less than or equal to two from the non-word spelling error. The edit distance may limit a list of plausible replacements for a non-word spelling error. That is, for each word not found in the corpus 118 (and therefore presumably misspelled), the candidate suggestions may represent a list of words in the corpus 118 that are a small edit distance away from the spelling of the non-word spelling error. In some instances, to limit the candidate suggestions, only words that are two charters shorter or longer than the non-word spelling error may be selected.

In some instances, the suggestion component 116 may utilize surrounding words, or a context of the non-word spelling error (i.e., n-grams surrounding the non-word spelling error), to determine the candidate suggestions. For example, utilizing the non-word spelling error and/or the surrounding words, the suggestion component 116 may determine n-grams for the non-word spelling error and/or the suggested candidate. By way of example, a trigram may include the word preceding the non-word spelling error, the non-word spelling error, and the word succeeding the non-word spelling error. These n-grams may be compared against the corpus 118 to determine possible candidate suggestions. The database may also store the frequencies of the n-grams, such as unigrams, bigrams, and/or trigrams. For example, text may be converted into a set of n-grams and to learn frequencies of n-grams from the corpus for a particular language.

At 512, the process 500 may rank the candidate suggestions. Ranking the candidate suggestions may involve analyzing the tokens relative to the corpus 118, including a distribution of n-grams within the corpus 118, associations between n-grams in the corpus 118, etc. Additionally, or alternatively, the suggestion component 116 may rank the candidate suggestions based at least in part on a frequency of occurrence of the n-gram within the corpus 118. That is, a frequency occurrence for each n-gram may be searched within the corpus 118. Based at least in part on the frequency of occurrence within the corpus 118, an n-gram conditional probability may be determined, where the n-gram conditional probability represents a score of the candidate suggestion within the context of the digital content. For example, using the preceding or succeeding word(s) of the non-word spelling error in the digital content, a conditional probability may be calculated using the corpus 118, where the conditional probability indicates the probability that the candidate suggestion corresponds to a proper replacement for the non-word spelling error. In some instances, to rank the candidate suggestions, a weight may be assigned to n-gram conditional probabilities. As shown in FIG. 5, the process 500 may include detailed operations for ranking the candidate suggestions and may include determining a unigram, bigram, trigram score, and/or a weighted score for the candidate suggestions.

For instance, at 514, the process 500 may calculate a unigram score the candidate suggestions. The unigram score may represent the frequency of the candidate suggestion in the corpus 118. At 516, the process 500 may calculate a bigram score for the candidate suggestions. The bigram score may represent the frequency of the candidate suggestion within the corpus 118 and the word either preceding the candidate suggestion and/or succeeding the candidate suggestion. For example, if the non-word spelling error is "favrite" in the sentence "my favrite ice-cream flavor is strawberry," and the candidate suggestion is "favorite," the bigram score may represent the frequency of occurrence for the bigram "my favorite" (i.e., preceding word in the sentence context) and the bigram "favorite ice-cream" (i.e., succeeding word in the sentence context). At 518, the process 500 may calculate a trigram score for the candidate suggestions. For example, in the above example, the trigram score may represent the frequency of occurrence for the trigram "my favorite ice-cream" and the trigram "favorite ice-cream flavor."

At 520, the process 500 may determine or calculate a weighted score based at least in part on the unigram, bigram, and trigram scores to indicate the probability of the candidate suggestion being the correct suggestion based at least in part on the context of the candidate suggestion within the digital content. Noted above, the weight assigned to the unigram, bigram, and trigram scores may be based at least in part on the language corresponding to the corpus 118. Accordingly, the process 500 may weigh the unigram score, the bigram score, and/or the trigram score to determine a cumulative score for the candidate suggestion. In doing so, the process 500 may generate possible candidates for a non-word spelling error with an edit-distance of two, may rank them based at least in part on the context they are used in, and may then produces a list.

At 522, the process 500 may cause the candidate suggestions to be presented. For example, the candidate suggestions may be presented on a display of an electronic device as a pop-up or drop-down menu adjacent to (e.g., above, below, besides, etc.) the non-word spelling error. In some instances, the candidate suggestions may be presented as a list in descending order based on the weighted score as determined previously. Additionally, in some instances, the list of candidate suggestions may be limited to a pre-defined number (e.g., top ten) or the all candidate suggestions may be presented. Additionally, or alternatively, in some instances, only candidate suggestions having a score greater than a predefined threshold may be presented.

From 522, the process 500 may loop to 502 to continue to receive digital content and perform spell checking.

FIG. 6 illustrates an example process 600 for configuring a spell checker based on the language of digital content. At 602, the process 600 may determine a first language. For example, the spell checker component 102 may determine the user is typing, or has otherwise entered text (e.g., a voice command and subsequent speech-to-text conversion), in Spanish, or may receive an indication that the user is typing, or has entered text, in Spanish. At 604, the process 600 may load a first corpus corresponding to the first language. For example, based at least in part on determining the first language (e.g., Spanish), a corpus corresponding to the first language may be loaded into the memory 110 of the computing device 106. In some instances, the first corpus may be received from the remote system 130 or the computing device 106 may access the first corpus that is stored by the remote system 130. As shown in FIG. 6, the first corpus may include word(s), n-grams, frequencies of the words and/or n-grams, and a weight assigned to the n-grams (e.g., unigram, bigram, and/or trigram). From 604, the process 600 may continue to 606 to perform spell checking. For example, the spell checker component 102 may perform spell checking on digital content utilizing the first corpus.

From time to time, the spell checker component 102 may configure to particular languages. For example, a user may switch from typing in Spanish to typing in Finish, or the user may switch from speaking in Spanish to speaking in Finish and a speech-to-text service may convert the audio data to text. Accordingly, at 608, the process 600 may determine a second language. For example, the spell checker component 102 may determine the user is typing or speaking in Finish, or may receive an indication that the user is typing or speaking in Finish. At 610, the process 600 may load a second corpus corresponding to the second language. For example, based at least in part on determining the second language (e.g., Finish), a corpus corresponding to the second language may be loaded into the memory 110 of the computing device 106. In some instances, the second corpus may be received from the remote system 130 or the computing device 106 may access the second corpus that is stored by the remote system 130. As shown in FIG. 6, the second corpus may include word(s), n-grams, frequencies of the words and/or n-grams, and a weight assigned to the n-grams (e.g., unigram, bigram, and/or trigram). From 610, the process 600 may continue to 612 to perform spell checking. For example, the spell checker component 102 may perform spell checking on digital content utilizing the second corpus. Accordingly, the process 600 illustrates configuring the spell checker component 102 according to a language of the digital content. As discussed above, configuring the spell checker component 102 according to the language may involve loading or utilizing a corpus corresponding to the language.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method comprising:
receiving digital text corresponding to an electronic document;
tokenizing the digital text into tokens, individual tokens of the tokens representing a string of characters within the digital text;
comparing the tokens to a corpus corresponding to a language of the electronic document, the corpus comprising recognized words associated with the language;
identifying a token of the tokens that corresponds to a non-word spelling error within the digital text based on the token being absent from the corpus;
determining a first candidate suggestion and a second candidate suggestion for the non-word spelling error;
determining a first unigram, a first bigram, and a first trigram of the first candidate suggestion;
determining a first unigram score, a first bigram score, and a first trigram score of the first candidate suggestion based on a first frequency of the first unigram, the first bigram, and the first trigram within the corpus;
determining a second unigram, a second bigram, and a second trigram of the second candidate suggestion;
determining a second unigram score, a second bigram score, and a second trigram score of the second candidate suggestion based on a second frequency of the second unigram, the second bigram, and the second trigram within the corpus;
applying a unigram weight to the first unigram, a bigram weight to the first bigram, and a trigram weight to the first trigram;
determining a first cumulative score for the first candidate suggestion based on the unigram weight, the bigram weight, and the trigram weight;
applying the unigram weight to the second unigram, the bigram weight to the second bigram, and the trigram weight to the second trigram;
determining a second cumulative score for the second candidate suggestion; and
causing display of the first candidate suggestion and the second candidate suggestion in association with the non-word spelling error.

2. The method of claim 1, further comprising:
determining that the first cumulative score is greater than the second cumulative score; and
determining, based on the first cumulative score being greater than the second cumulative score, a first ranking for the first candidate suggestion and a second ranking for the second candidate suggestion, the first ranking being greater than the second ranking.

3. The method of claim 1, further comprising:
receiving an indication of a selection of the first candidate suggestion or the second candidate suggestion; and
causing the first candidate suggestion or the second candidate suggestion to replace the non-word spelling error within the digital text.

4. The method of claim 1, further comprising determining the unigram weight, the bigram weight, and the trigram weight based on the language associated with the corpus.

5. A computer-implemented method comprising:
receiving text data associated with digital content;
determining a corpus corresponding to a language of the digital content;
comparing one or more tokens of the digital content to the corpus;
identifying a non-word spelling error within the digital content based at least in part on comparing the one or more tokens of the digital content to the corpus;
determining one or more candidate suggestions for the non-word spelling error;
determining at least one of a unigram conditional probability, a bigram conditional probability, or a trigram conditional probability for a candidate suggestion of the one or more candidate suggestions;
applying at least one of a first weight to the unigram conditional probability, a second weight to the bigram conditional probability, or a third weight to the trigram conditional probability;
determining a score for the candidate suggestion; and
causing presentation of the candidate suggestion.

6. The computer-implemented method of claim 5, further comprising determining the score for the candidate suggestion based at least in part on at least one of:
the first weight applied to the unigram conditional probability;
the second weight applied to the bigram conditional probability; or
the third weight applied to the trigram conditional probability.

7. The computer-implemented method of claim 5, further comprising determining a ranking of the one or more candidate suggestions based at least in part on the score, and wherein causing presentation of the candidate suggestion comprises presenting the candidate suggestion as a ranked list with at least one other candidate suggestion of the one or more candidate suggestions.

8. The computer-implemented method of claim 5, wherein causing presentation of the candidate suggestion comprises presenting a predetermined number of top ranked candidate suggestions.

9. The computer-implemented method of claim 5, wherein at least one of the first weight, the second weight, or the third weight is based at least in part on the language of the digital item.

10. The computer-implemented method of claim 5, wherein determining the at least one of the unigram conditional probability, the bigram conditional probability, or the trigram conditional probability comprises at least one of:
   determining a first frequency of unigrams within the corpus;
   determining a second frequency of bigrams within the corpus; or
   determining a third frequency of trigrams within the corpus.

11. The computer-implemented method of claim 5, further comprising determining that the candidate suggestion has an edit distance of one or two relative to the non-word spelling error.

12. The computer-implemented method of claim 5, further comprising tokenizing content of the digital item to generate the one or more tokens, the one or more tokens having a length of at least two characters.

13. The computer-implemented method of claim 5, further comprising:
   receiving an indication of a selected candidate suggestion; and
   causing the selected candidate suggestion to be inserted into the digital item to replace the non-word spelling error.

14. A system comprising:
   one or more processors; and
   memory storing one or more computer-executable instructions that are executable by the one or more processors to perform operations comprising:
      determining a corpus associated with digital content;
      identifying a non-word spelling error within the digital content;
      identifying one or more candidate suggestions for the non-word spelling error;
      determining one or more n-grams associated with a candidate suggestion of the one or more candidate suggestions;
      calculating a score for an n-gram of the one or more n-grams based at least in part on a frequency of occurrence of the n-gram within the corpus;
      applying one or more weights to the n-gram; and
      determining, based at least in part on the one or more weights applied to the n-gram, a composite score for the candidate suggestion.

15. The system of claim 14, wherein the n-gram comprises at least one of:
   a unigram of the candidate suggestion;
   at least one bigram of the candidate suggestion; or
   at least one trigram of the candidate suggestion.

16. The system of claim 15, wherein applying the one or more weights comprises at least one of:
   applying a first weight to the unigram;
   applying a second weight to the at least one bigram; or
   applying a third weight to the at least one trigram.

17. The system of claim 16, wherein the first weight, the second weight, and the third weight are based at least in part on a language of the corpus.

18. The system of claim 14, wherein the operations further comprise causing presentation of the candidate suggestion based at least in part on the composite score.

19. The system of claim 14, wherein the operations further comprise ranking the candidate suggestion in association with at least one other candidate suggestion of the one or more candidate suggestions based at least in part on the composite score for the candidate suggestion.

20. The system of claim 14, wherein the operations further comprise:
   tokenizing content of the digital content to generate one or more tokens; and
   comparing the one or more tokens to the corpus,
   wherein identifying the non-word spelling error within the digital content is based at least in part on comparing the one or more tokens to the corpus.

* * * * *